(12) United States Patent
Jeon et al.

(10) Patent No.: US 11,155,369 B2
(45) Date of Patent: Oct. 26, 2021

(54) ARTIFICIAL SATELLITE AND METHOD OF CONTROLLING THE SAME

(71) Applicant: KOREA AEROSPACE RESEARCH INSTITUTE, Daejeon (KR)

(72) Inventors: Moon-Jin Jeon, Daejeon (KR); Seok-Weon Choi, Daejeon (KR); Seong-Bin Lim, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 499 days.

(21) Appl. No.: 16/027,705

(22) Filed: Jul. 5, 2018

(65) Prior Publication Data

US 2019/0055038 A1 Feb. 21, 2019

(30) Foreign Application Priority Data

Aug. 16, 2017 (KR) .................. 10-2017-0103725

(51) Int. Cl.
| | | |
|---|---|---|
| *H02S 10/40* | (2014.01) | |
| *B64G 1/44* | (2006.01) | |
| *B64G 1/10* | (2006.01) | |
| *H02S 20/32* | (2014.01) | |

(52) U.S. Cl.
CPC ............. *B64G 1/443* (2013.01); *B64G 1/105* (2013.01); *H02S 10/40* (2014.12); *H02S 20/32* (2014.12); *B64G 2001/1064* (2013.01)

(58) Field of Classification Search
CPC .................... B64G 1/443; B64G 1/105; B64G 2001/1064; B64G 1/242; B64G 2001/1028; B64G 1/44; B64G 1/244; B64G 1/1021; B64G 1/66; H02S 10/40; H02S 20/32; H02S 20/30; H04N 5/3692
See application file for complete search history.

(56) References Cited

U.S. PATENT DOCUMENTS

| | | | | |
|---|---|---|---|---|
| 4,949,922 A | * | 8/1990 | Rosen ..................... | B64G 1/244 244/168 |
| 5,149,022 A | * | 9/1992 | Flament ................. | B64G 1/407 244/168 |
| 5,259,577 A | * | 11/1993 | Achkar .................... | B64G 1/36 244/164 |
| 5,312,073 A | * | 5/1994 | Flament ................... | B64G 1/44 244/168 |
| 5,412,574 A | * | 5/1995 | Bender .................... | B64G 1/36 701/513 |
| 5,775,645 A | * | 7/1998 | Yocum, Jr. ............. | B64G 1/285 244/168 |
| 5,934,620 A | * | 8/1999 | Abernethy ............. | B64G 1/285 244/168 |
| 6,021,979 A | * | 2/2000 | Bender .................. | B64G 1/244 244/164 |

(Continued)

*Primary Examiner* — Brian M O'Hara
*Assistant Examiner* — Keith L Dixon
(74) *Attorney, Agent, or Firm* — Buchanan Ingersoll & Rooney PC

(57) ABSTRACT

Provided are an artificial satellite and a method of controlling the same. The artificial satellite includes a main body flying along an orbit of a planet, an optical payload arranged on the main body to photograph a ground surface of the planet, and a pair of solar cell panels rotatably arranged on both sides of the main body in a first direction, wherein the first direction and a flight direction of the main body form an acute angle with each other.

22 Claims, 11 Drawing Sheets

(56) References Cited

U.S. PATENT DOCUMENTS

| | | | | |
|---|---|---|---|---|
| 6,616,104 | B1* | 9/2003 | Cheng | B64G 1/1007 |
| | | | | 244/158.6 |
| 7,357,356 | B1* | 4/2008 | Goodzeit | B64G 1/283 |
| | | | | 244/164 |
| 7,823,836 | B2* | 11/2010 | Ho | B64G 1/244 |
| | | | | 244/164 |
| 2005/0133671 | A1* | 6/2005 | Wang | B64G 1/288 |
| | | | | 244/170 |
| 2006/0118677 | A1* | 6/2006 | Goodzeit | B64G 1/244 |
| | | | | 244/164 |
| 2007/0023579 | A1* | 2/2007 | Wang | B64G 1/44 |
| | | | | 244/158.6 |
| 2007/0126867 | A1* | 6/2007 | McCutchen | G08B 13/19626 |
| | | | | 348/143 |
| 2011/0024571 | A1* | 2/2011 | Tsao | B64G 1/281 |
| | | | | 244/171 |
| 2013/0292518 | A1* | 11/2013 | Lagadec | B64G 1/244 |
| | | | | 244/168 |

\* cited by examiner

ARTIFICIAL SATELLITE AND METHOD OF CONTROLLING THE SAME

CROSS-REFERENCE TO RELATED APPLICATION

This application claims the benefit of Korean Patent Application No. 10-2017-0103725, filed on Aug. 16, 2017, in the Korean Intellectual Property Office, the disclosure of which is incorporated herein in its entirety by reference.

BACKGROUND

1. Field

One or more embodiments relate to artificial satellites and methods of controlling the same, and more particularly, to artificial satellites capable of performing power charge by using sunlight while performing a photographing mission and methods of controlling the same.

2. Description of the Related Art

In the case of an artificial satellite flying an orbit other than a sun-synchronous orbit, the angle between an orbital plane and a star direction varies with time. For example, in the case of an artificial satellite orbiting a planet such as Venus or a satellite such as Moon, the angle between a sun direction and an orbital plane defined by an orbit is referred to as a sun beta angle. As the earth orbits the sun, the sun beta angle of a moon orbit varies from 0 degrees to 90 degrees. Thus, a Venus-orbiting artificial satellite or a Moon-orbiting artificial satellite should use a power charge method that is different from a power charge method of an Earth-observing artificial satellite, for example, an artificial satellite flying a sun-synchronous orbit.

In the related art, a solar cell panel is connected to the main body of an artificial satellite by using a biaxial gimbal-type driving device. In this case, as the solar cell panel rotates, the center of mass of the solar cell panel is located on a different axis from the overall center of mass of the artificial satellite and thus there is a disadvantage of being affected by a disturbance.

As another method in the related art, there is a method in which a solar cell panel is arranged to have a fixed cant angle with respect to the center axis of an artificial satellite. According to this method, as the incidence angle of sunlight incident on the solar cell panel becomes lower than a certain level, it may be possible to charge power more than a certain level regardless of a beta angle. This method is advantageous in that it may be implemented more easily than a biaxial gimbal type, but has a disadvantage in that it not only may fail to charge the maximum power in a power charge process but also may be structurally vulnerable to a disturbance.

SUMMARY

One or more embodiments include an artificial satellite capable of efficiently performing power charge by using sunlight while performing a photographing mission in a planetary orbit.

One or more embodiments include a method of controlling an artificial satellite capable of efficiently performing power charge by using sunlight while performing a photographing mission in a planetary orbit.

Additional aspects will be set forth in part in the description which follows and, in part, will be apparent from the description, or may be learned by practice of the presented embodiments.

According to one or more embodiments, an artificial satellite includes: a main body flying along an orbit of a planet; an optical payload arranged on the main body to photograph a ground surface of the planet; and a pair of solar cell panels rotatably arranged on both sides of the main body in a first direction, wherein the first direction and a flight direction of the main body form an acute angle with each other.

According to one or more embodiments, an artificial satellite includes: a main body flying along an orbit of a planet; a pair of solar cell panels rotatably arranged on both sides of the main body in a first direction; and a linear image sensor arranged on the main body and including pixels arranged in a line along a second direction forming an acute angle with the first direction.

According to one or more embodiments, a method of controlling an artificial satellite including a main body flying along an orbit of a planet, an optical payload mounted on the main body to photograph a ground surface of the planet in a line scan manner, and a pair of solar cell panels rotatably arranged on both sides of the main body in a first direction, wherein the first direction and a second direction perpendicular to a flight direction of the main body are designed to form an angle $\psi$ of between about 0 degrees to about 90 degrees with each other, includes: determining a beta angle $\beta$ between a star direction $u_x$ and an orbital plane of the orbit where the artificial satellite is currently flying; determining a latitude $\varphi$ of the planet where the artificial satellite is currently located; calculating a rotation angle $\theta$ of the pair of solar cell panels based on the beta angle $\beta$, the latitude $\varphi$, and the angle $\psi$; and rotating the pair of solar cell panels by the rotation angle $\theta$ with respect to the main body.

According to one or more embodiments, a non-transitory computer-readable recording medium has recorded thereon a program for executing the method of controlling the artificial satellite.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
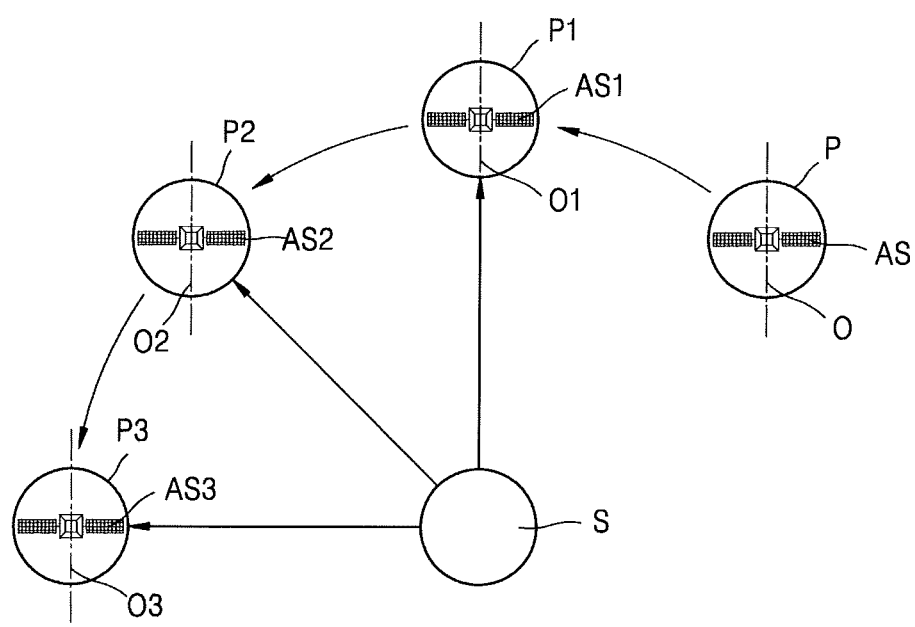
FIG. 1 conceptually illustrates an arrangement of a planet orbiting a star and an artificial satellite orbiting the planet.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the present disclosure will be described in detail with reference to the accompanying drawings.

The embodiments of the present disclosure are provided to more fully describe the present disclosure to those of ordinary skill in the art, the following embodiments may be modified into various other forms, and the scope of the present disclosure is not limited to the following embodiments. Rather, these embodiments are provided so that this disclosure will be more thorough and complete, and will fully convey the concept of the disclosure to those of ordinary skill in the art.

The terminology used herein is for the purpose of describing particular embodiments only and is not intended to limit the present disclosure. As used herein, the singular forms "a", "an", and "the" may include plural forms unless the context clearly indicates otherwise. Also, when used in this specification, the terms "include (comprise)" and/or "including (comprising)" specify the presence of the stated shapes, numbers, steps, operations, members, elements, and/or groups thereof and do not preclude the presence or addition of one or more other shapes, numbers, operations, members, elements, and/or groups thereof. As used herein, the term "and/or" may include any and all combinations of one or more of the associated listed items.

Although terms such as "first" and "second" are used herein to describe various members, regions, and/or directions, these members, regions, and/or directions are not limited by these terms. These terms are not intended to mean particular orders, priorities, or superiorities, and are used only to distinguish one member, region, or direction from another member, region, or direction. Thus, a first member, region, or direction to be described below may refer to a second member, region, or direction without departing from the teachings of the present disclosure.

Hereinafter, embodiments of the present disclosure will be described with reference to the drawings schematically illustrating example embodiments of the present disclosure.

FIG. 1 conceptually illustrates an arrangement of a planet orbiting a star and an artificial satellite orbiting the planet.

Referring to FIG. 1, a star S is a high-temperature celestial body that emits light by itself through a fusion reaction, and a representative example thereof is the sun. There may be a planet P orbiting the star S around the star S. Also, an artificial satellite AS may perform a mission related to the planet P while orbiting the planet P. The mission related to the planet P may be to observe the planet P or to photograph a ground surface of the planet P.

Planets P1, P2, and P3 and artificial satellites AS1, AS2, and AS3 illustrated in FIG. 1 correspond to different viewpoints of the same planet P orbiting the star S and the same artificial satellite AS orbiting the planet P. The planet P1 and the artificial satellite AS1 flying along an orbit O1 of the planet P1 represent the planet P and the artificial satellite AS of a first viewpoint. The planet P2 and the artificial satellite AS2 flying along an orbit O2 of the planet P2 represent the planet P and the artificial satellite AS of a second viewpoint. The planet P3 and the artificial satellite AS3 flying along an orbit O3 of the planet P3 represent the planet P and the artificial satellite AS of a third viewpoint.

The planet P is a celestial body that rotates around the star S and does not emit light by itself, and may be any one of Mercury, Venus, Mars, Jupiter, Saturn, Uranus, and Neptune in the solar system. Also, there may be a satellite orbiting the planet P around the star S. The satellite is a celestial body that orbits the planet P by the attraction of the planet P, and may be a natural satellite such as Moon that is a satellite of Earth or Phobos that is a satellite of Mars. In this specification, the planet P is an object on which the artificial satellite AS performs a mission while orbiting therearound, and should be understood as including the satellite orbiting the planet P as well as the planet P orbiting the star S. Thus, the planet P includes Moon or Phobos as well as Venus or Mars. Hereinafter, for easy understanding, it is assumed that the star S and the planet P are the sun S and the moon P respectively. However, this is merely an example and the present disclosure is not limited thereto.

An orbit O along which the artificial satellite AS flies may be fixed with respect to the moon P. For example, the artificial satellite AS may fly a fixed moon orbit O passing both poles (e.g., north pole and south pole) of the moon P. However, as the earth orbited by the moon P orbits the sun S, the relative position of the sun S and the moon P changes and thus the moon orbit O of the artificial satellite AS changes with respect to the star S.

Figure 2:
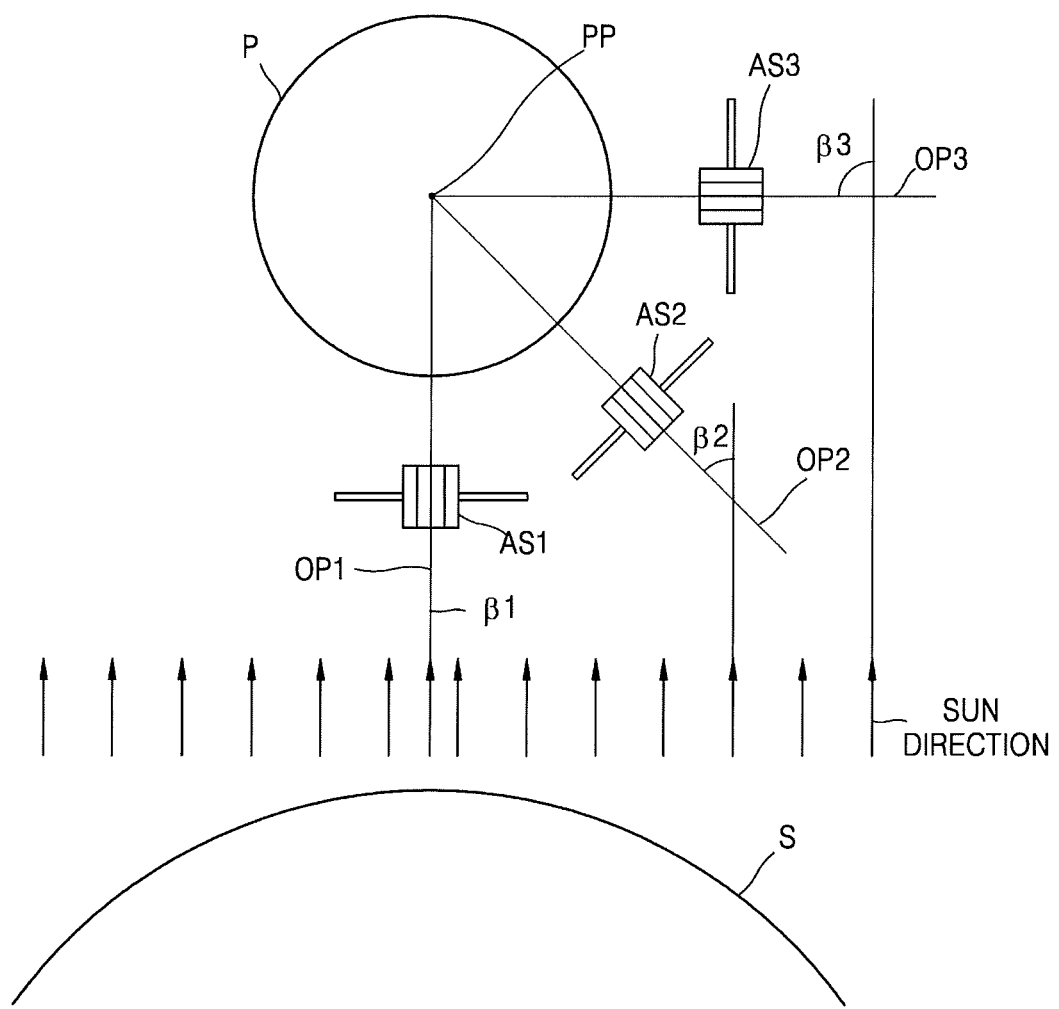
FIG. 2 conceptually illustrates a beta angle between a sun direction and an orbital plane of an artificial satellite.

FIG. 2 conceptually illustrates a beta angle between a sun direction and an orbital plane of an artificial satellite.

Referring to FIG. 2 together with FIG. 1, the artificial satellite AS may fly along the orbit O passing over the north pole PP of the moon P. In this case, the angle between the orbital plane and the sun S around the artificial satellite AS in the orbit flown by the artificial satellite AS may be defined as a sun beta angle or a beta angle. As described with reference to FIG. 1, when the viewpoint changes, the sun beta angle may change within a range of about 0 degrees to about 90 degrees.

For example, an orbital plane OP1 of the orbit O1 flown by the artificial satellite AS1 of the first viewpoint is parallel to the sun direction. That is, the normal direction of the orbital plane OP1 is perpendicular to the sun direction. In this case, a sun beta angle β1, which is the angle between the orbital plane OP1 and the sun direction, is 0 degrees. Herein, the sun direction may mean a direction in which the sun S is viewed from the artificial satellite AS. Since the distance between the artificial satellite AS and the moon P is negligibly small in comparison with the distance between the artificial satellite AS and the sun S, the sun direction may be understood as a direction in which a line connecting the center of the moon P to the center of the sun S extends.

In general, when an artificial satellite includes a pair of solar cell panels, the pair of solar cell panels may be installed in a direction perpendicular to the flight direction of the artificial satellite. At the first viewpoint where the sun beta angle β1 is 0, since the solar cell panel may face the sun S while an optical payload of the artificial satellite AS1 faces the moon P, the solar cell panel may charge solar power at an efficiency of 100%.

An orbital plane OP2 of the orbit O2 flown by the artificial satellite AS2 of the second viewpoint forms a sun beta angle β2 with the sun direction. At the second viewpoint, when an optical payload of the artificial satellite AS2 faces the moon P, since the normal direction of the solar cell panel is not identical to the sun direction, the solar cell panel may have no choice but to charge solar power at an efficiency of less than 100%. For example, when the sun beta angle β2 is 45 degrees, since sunlight is incident on the solar cell panel at an angle of 45 degrees, the solar cell panel may charge solar power at an efficiency of about 70%.

An orbital plane OP3 of the orbit O3 flown by the artificial satellite AS3 of the third viewpoint is perpendicular to the sun direction, and in this case, a sun beta angle β3 is 90 degrees. At the third viewpoint, when an optical payload of the artificial satellite AS3 faces the moon P, the solar cell panel coincides with the sun direction. In this case, sunlight may not be incident on the solar cell panel, and the solar cell panel may not generate solar power.

Figure 3:
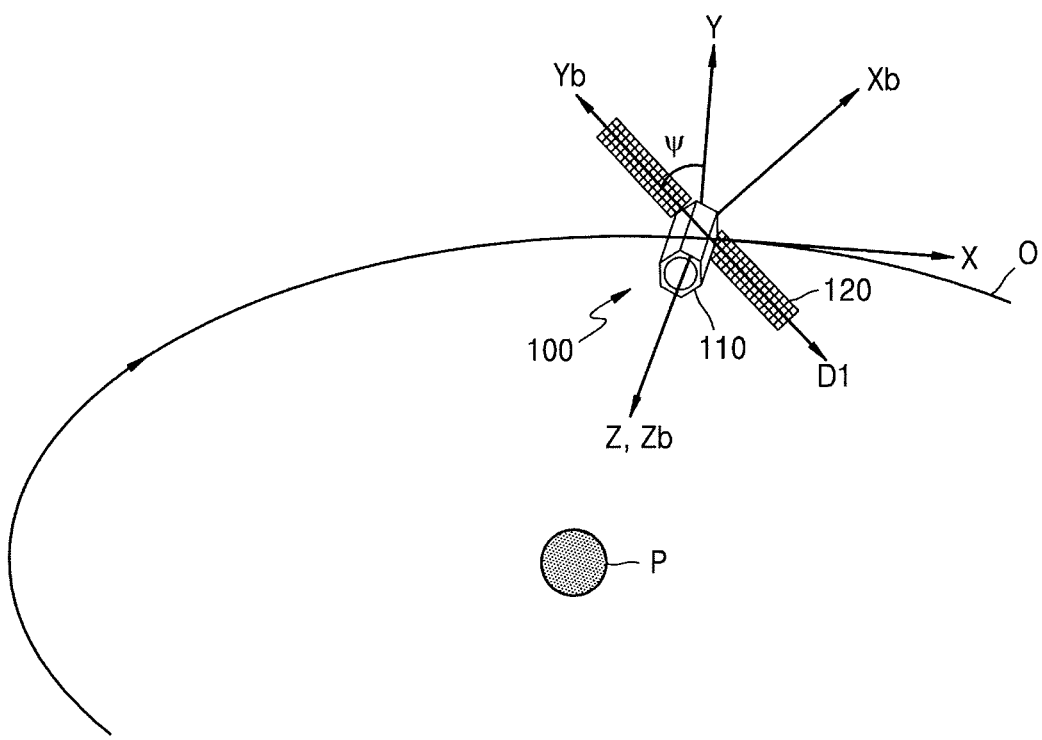
FIG. 3 is a diagram illustrating a body coordinate system of an artificial satellite flying an orbit of a planet according to an embodiment of the present disclosure.

FIG. 3 is a diagram illustrating a body coordinate system of an artificial satellite flying an orbit of a planet according to an embodiment of the present disclosure.

Referring to FIG. 3, an artificial satellite 100 flies along an orbit O of a planet P. The artificial satellite 100 includes a main body 110 and a pair of solar cell panels 120 arranged on both sides of the main body 110. The pair of solar cell panels 120 are arranged in a first direction D1 from the main body 110.

An optical payload (not illustrated) for photographing a ground surface of the planet P may be arranged on the main body 110 of the artificial satellite 100. The main body 110 may be arranged in a vertical direction Z in order for the optical payload to photograph a ground surface of the planet P. A direction in which the artificial satellite 100 flies along the orbit O may be referred to as a flight direction X. A direction perpendicular to the flight direction X and the vertical direction Z may be referred to as a horizontal direction Y.

The flight direction X, the horizontal direction Y, and the vertical direction Z may constitute a flight coordinate system of the artificial satellite 100.

An attitude of the artificial satellite 100 may be defined by a roll angle, a pitch angle, and a yaw angle. The roll angle may mean an angle at which the artificial satellite 100 rotates on an axis of the flight direction X. The axis of the flight direction X may be included in an orbital plane. The pitch angle may mean an angle at which the artificial satellite 100 rotates on an axis of the horizontal direction Y. The axis of the horizontal direction Y may be perpendicular to the orbital plane. The yaw angle may mean an angle at which the artificial satellite 100 rotates on an axis of the vertical direction Z. The axis of the vertical direction Z may be perpendicular to the orbital plane.

In a related-art artificial satellite, a pair of solar cell panels are arranged in the horizontal direction Y with respect to the main body. Unlike this, in the artificial satellite 100 according to an embodiment of the present disclosure, the pair of solar cell panels are arranged in the first direction D1 with respect to the main body 110. The first direction D1 forms an angle ψ of about 0 degrees to about 90 degrees with the horizontal direction Y.

This arrangement of the artificial satellite 100 may be understood as the rotation of the related-art artificial satellite on the axis of the vertical direction Z by the angle ψ. Thus, the first direction D1 may be identical to a direction Yb in which the horizontal direction Y is rotated by the angle ψ. The angle ψ of the rotation on the axis of the vertical direction Z may be referred to as a yaw angle ψ.

The direction Xb, the direction Yb, and the vertical direction Zb, in which the flight direction X is rotated by the angle ψ, may constitute a body coordinate system of the artificial satellite 100. The vertical direction Zb of the body coordinate system may be identical to the vertical direction Z of the flight coordinate system.

Figure 4:
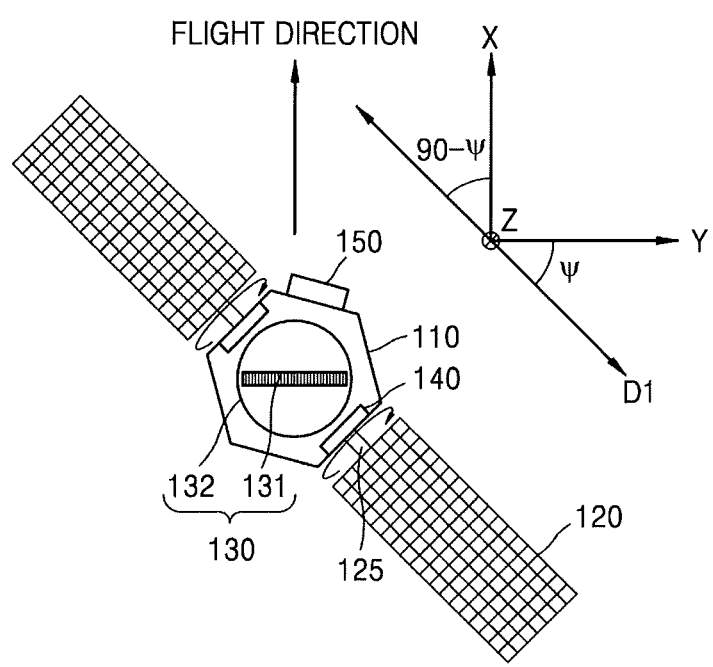
FIG. 4 is a schematic diagram of an artificial satellite according to an embodiment of the present disclosure.

FIG. 4 is a schematic diagram of an artificial satellite according to an embodiment of the present disclosure.

Referring to FIG. 4, an artificial satellite 100 includes a main body 110, a solar cell panel 120, and an optical payload 130. The artificial satellite 100 may further include a rotation driver 140 and/or a controller 150.

The main body 110 is a basic structure constituting the body of the artificial satellite 100, and includes supports for supporting various components. Although the main body 110 is illustrated as having a hexagonal cross-sectional shape, this is merely an example and the main body 110 may have various cross-sectional shapes such as a tetragon or a circle. The main body 110 flies in a flight direction X along an orbit of a planet The solar cell panel 120 is a panel in which solar cells are arranged in series and/or in parallel, converts light into electricity by using a photovoltaic (PV) effect, and supplies electric power to the artificial satellite 100.

A pair of solar cell panels 120 are rotatably arranged on both sides of the main body 110 in a first direction D1. The pair of solar cell panels 120 may be arranged on the main body 110 in the first direction D1 and may rotate on a rotation axis 125 extending in the first direction D1. As illustrated in FIG. 4, the first direction D1 may mean both directions.

The first direction D1 may form an acute angle with the flight direction X. For example, the angle between the first direction D1 and the flight direction X may be about 30 degrees to about 60 degrees. For example, the angle between the first direction D1 and the flight direction X may be about 40 degrees to about 50 degrees. For example, the angle between the first direction D1 and the flight direction X may be about 45 degrees.

The first direction D1 may form an acute angle with a horizontal direction Y. For example, an angle ψ between the first direction D1 and the horizontal direction Y may be about 30 degrees to about 60 degrees. For example, the angle ψ between the first direction D1 and the horizontal direction Y may be about 40 degrees to about 50 degrees. For example, the angle ψ between the first direction D1 and the horizontal direction Y may be about 45 degrees.

As illustrated in FIG. 4, the center of mass of each solar cell panel 120 is located on an extension line of the rotation axis 125, and thus the center of mass of the solar cell panel 120 may always be located on the extension line of the rotation axis 125 even when the solar cell panel 120 rotates. The pair of solar cell panels 120 may be symmetrical to each other and the center of mass of the solar cell panel 120 may be identical to the center of mass of the main body 110. Thus, even when the solar cell panel 120 rotates, the center of mass of the main body 110 may not change. The center of mass of the artificial satellite 100 may be located on the rotation axis 125 overall.

As illustrated in FIG. 4, since the center of each solar cell panel 120 is located on the extension line of the rotation axis 125, the normal direction of the solar cell panel 120 is perpendicular to the rotation axis 125

Since the solar cell panel 120 rotates on one rotation axis 125 and the center of mass of the solar cell panel 120 is located on the extension line of the rotation axis 125, the influence of a disturbance may be minimized even when the solar cell panel 120 rotates. Also, since the change in the center of mass of the main body 110 may be minimized even when the solar cell panel 120 rotates, the rotation momentum transmitted to a reaction wheel may be minimized and the number of times of momentum dumping may be reduced.

The solar cell panel 120 may rotate by a rotation angle θ on the rotation axis 125. The rotation angle θ may be defined with respect to a case where the normal direction of the solar cell panel 120 is a vertical direction Z. When the normal direction of the solar cell panel 120 is the vertical direction Z, the rotation angle θ may be 0 degrees.

The rotation driver 140 may rotate the pair of solar cell panels 120 on the rotation axis 125 by the rotation angle θ with respect to the main body 110. The rotation driver 140 may include, for example, a motor. The rotation driver 140 may rotate the pair of solar battery panels 120 simultaneously by the same rotation angle θ. When the pair of solar cell panels 120 are connected to one rotation axis 125, the rotation driver 140 may rotate the pair of solar cell panels 120 simultaneously by rotating the rotation axis 125. When the pair of solar battery panels 120 are connected to the main body 110 through the respective rotation axes 125, the rotation driver 140 may exist in pair to rotate the respective rotation axes 125.

The optical payload 130 may be located on the main body 110 to photograph a ground surface of the planet. The optical payload 130 may include a linear image sensor 131 and an optical system 132. The optical system 132 may include at least one lens and/or a reflector. The linear image sensor 131 may include pixels arranged in a line in a second direction. The second direction may be perpendicular to the flight direction X and may be identical to the horizontal direction Y.

Figure 5:
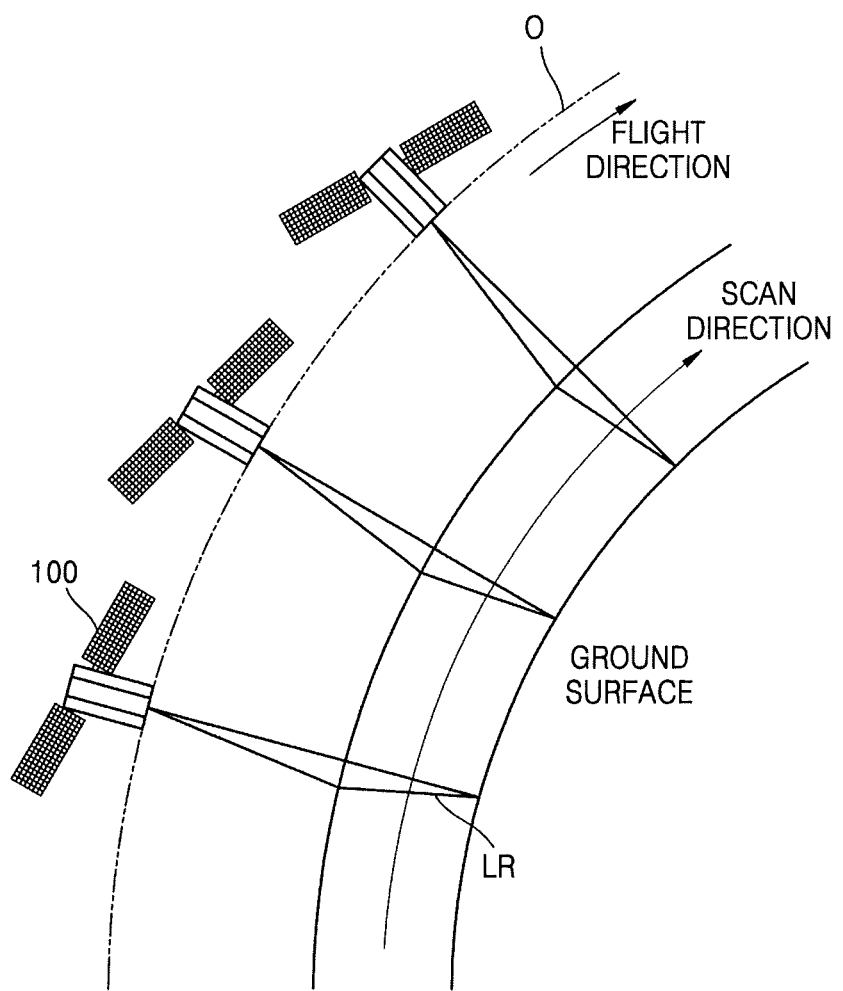
FIG. 5 is a diagram illustrating a method of photographing a ground surface in a line scan manner by an artificial satellite according to an embodiment of the present disclosure.

The optical payload 130 may photograph a ground surface of the planet in a line scan manner. FIG. 5 is a diagram illustrating a method of photographing a ground surface in a line scan manner by an artificial satellite according to an embodiment of the present disclosure.

Referring to FIG. 5 together with FIG. 4, the linear image sensor 131 may sense an image of a line region LR of the ground surface through the optical system 132. Since the linear image sensor 131 includes pixels arranged in the horizontal direction Y perpendicular to the flight direction X, the line region LR also corresponds to a thin region extending in a direction perpendicular to the flight direction. Depending on the performance of the optical payload 130, the line region LR may have, for example, a length of several tens km or more and a width of 1 m or less.

As the artificial satellite 100 flies along the flight direction X, the line region LR also moves in the same scan direction as the flight direction X. As the images sensed by the linear image sensor 131 are stored for each scan period, the line region LR and a region determined according to the scan direction may be photographed by the optical payload 130. The optical payload 130 may be referred to as a line scan camera because the optical payload 130 photographs the ground surface in a line scan manner that is a method of scanning the line region LR on a line-by-line basis along the flight direction X.

The controller 150 may determine the rotation angle θ based on the latitude φ where the artificial satellite 100 is currently located, the beta angle β of an orbital plane of an orbit where the artificial satellite 100 is currently rotating, and the angle ψ, and control the rotation driver 140 to rotate the pair of solar cell panels 120 by the determined rotation angle θ. The controller 150 will be described in more detail with reference to FIG. 6.

The main body 110 may be packaged with a multilayer film insulator to block sunlight, and a secondary mirror may be attached outside to discharge the hot heat generated in the main body 110.

The main body 110 may propel the artificial satellite 100 or control the attitude of the artificial satellite 100. The main body 110 may include sensors for sensing the attitude of the main body 110. The sensors may be earth sensors or star sensors and may sense the accurate attitude of the main body 110 by detecting the relative attitudes of the artificial satellite 100 with respect to the sun, the earth, stars, and/or the like. The main body 110 may include a thruster for ejecting the gas generated by burning fuel to move the artificial satellite 100. The main body 110 may include a reaction wheel to control the attitude of the artificial satellite 100. When an object with mass is rotated, an inertial force is generated to move in an opposite direction thereof. By using the inertial force, the reaction wheel may rotate the artificial satellite 100 on an axis of the flight direction X, an axis of the horizontal direction Y, and an axis of the vertical direction X.

The main body 110 may include a battery for charging the power generated from the solar cell panel 120. When the artificial satellite 100 flies on the sun-opposite side of the planet, the solar cell panel 120 may not generate solar power because the solar cell panel 120 may not receive sunlight. When the artificial satellite 100 flies on the sun side of the planet, the solar power generated by the solar cell panel 120 may be stored in the battery, and when the artificial satellite 100 flies on the sun-opposite side of the planet, the power stored in the battery may be used to perform a mission.

The main body 110 may include a communicator for communicating with a ground station. The communicator may include an antenna.

The controller 150 may control not only the optical payload 130 and the rotation driver 140 but also components such as the sensors, the thruster, the reaction wheel, and the battery, and may communicate with the ground station through the communicator.

According to embodiments, the controller 150 may be represented by functional block configurations and various processing operations. Some or all of these functional blocks may be implemented by any number of hardware and/or software components that execute particular functions.

According to an embodiment, the functional blocks of the controller 150 may be implemented by one or more microprocessors or may be implemented by circuit components for a certain function. According to another embodiment, the functional blocks of the controller 150 may be implemented in various programming or scripting languages. According to another embodiment, the functional blocks of the controller 150 may be implemented by algorithms executed on one or more processors. Meanwhile, the related art may be used for electronic environment setting, signal processing, and/or data processing of the controller 150.

Figure 6:
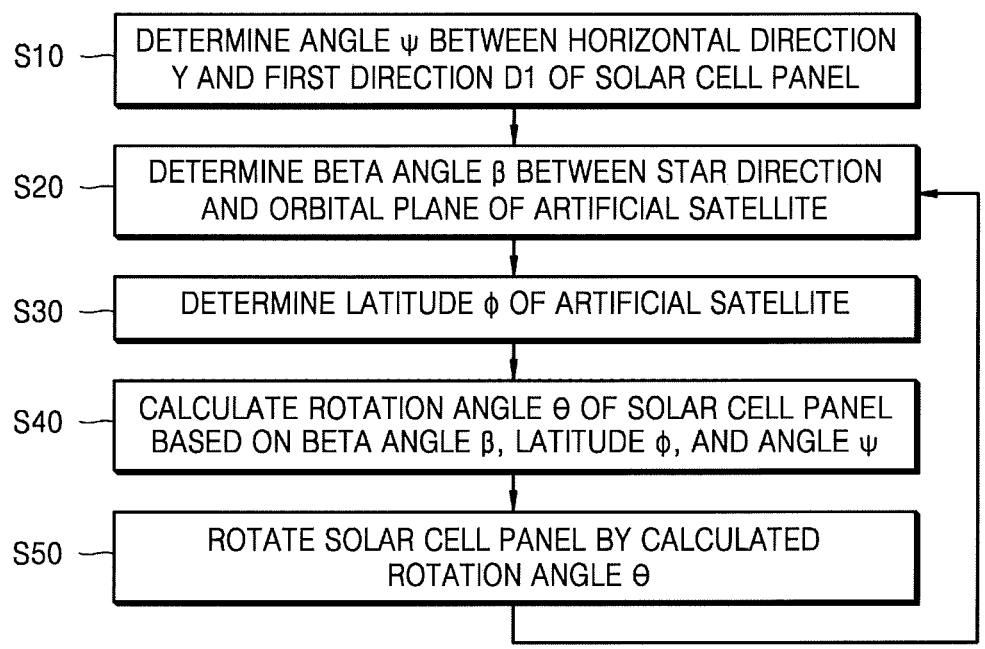
FIG. 6 is a control flowchart illustrating an operation of a controller of an artificial satellite according to an embodiment of the present disclosure.

FIG. 6 is a control flowchart illustrating an operation of a controller of an artificial satellite according to an embodiment of the present disclosure.

As described above, the artificial satellite 100 according to an embodiment includes a main body 110 flying along an orbit O of a planet P, an optical payload 130 mounted on the main body 110 to photograph a ground surface of the planet P in a line scan manner, and a pair of solar cell panels 120 rotatably arranged on both sides of the main body 110 in a first direction D1. According to an embodiment, an angle ψ between the first direction D1 and a second direction Y perpendicular to a flight direction X of the main body 110 is designed to be greater than 0 degrees and less than 90 degrees.

The angle ψ between the first direction D1 and the second direction Y is already determined in the process of designing the artificial satellite 100, and the angle ψ is substantially fixed after the artificial satellite 100 is manufactured and enters the orbit O. The artificial satellite 100 may rotate on an axis of a vertical direction Z due to disturbances or other missions. In this case, although the angle ψ may change, the angle ψ may be substantially fixed when the artificial satellite 100 performs a general mission on the orbit O, that is, a mission of photographing a ground surface of the planet P in a line scan manner.

The controller 150 determines the angle ψ between the first direction D1 in which the solar cell panels are arranged and the horizontal direction Y perpendicular to the flight direction X (S10). As described above, the angle ψ may be determined in the process of designing the artificial satellite 100, and information about the angle ψ of the artificial satellite 100 may be stored in a memory connected to a storage. The controller 150 may determine the angle ψ by reading the information about the angle ψ from the memory. The angle ψ may be referred to as a yaw angle ψ, and may be determined as an angle of, for example, about 30 degrees to about 60 degrees. The angle ψ may be determined as an angle of, for example, about 40 degrees to about 50 degrees. The angle ψ may be determined as an angle of, for example, 45 degrees.

The controller 150 determines a beta angle β between and a star direction $u_x$ and an orbital plane OP (see FIG. 2) of the orbit O currently flown by the artificial satellite 100 (S20). As described above, the beta angle β is defined as the angle between the orbital plane OP and the star on the artificial satellite 100. The star direction $u_x$ may be expressed as the direction from the planet P toward the star S.

The beta angle β changes according to the positional relationship between the planet P and the star S. The controller 150 may sense the beta angle β by using a planet sensor and/or a star sensor. Since the artificial satellite 100 flies the orbit O at a predetermined speed, it may be possible to accurately know how the beta angle β will change with time. The controller 150 may determine the beta angle β by using a predetermined formula or prestored data by using the current time. The controller 150 may receive information about the beta angle β from the ground station.

The controller 150 determines the latitude φ of the planet P where the artificial satellite 100 is currently located (S30). The controller 150 may sense the latitude φ by using a planet sensor and/or a star sensor. The controller 150 may determine the latitude φ by using a predetermined formula or prestored data by using the current time. The controller 150 may receive information about the latitude φ from the ground station.

The controller 150 calculates the rotation angle θ for receiving solar power most efficiently by the pair of solar cell panels 120 based on the beta angle β, the latitude φ, and the angle ψ (S40). The incidence angle of the sunlight incident on the solar cell panel 120 may be minimized when the solar cell panel 120 is rotated by the rotation angle θ. When the sunlight is vertically incident on the solar cell panel 120, the incidence angle is defined as 0 degrees. For example, the angle between the star direction $u_x$ and the normal direction of the solar cell panel 120 may be minimized when the solar cell panel 120 is rotated by the rotation angle θ. The angle is equal to the incidence angle of the sunlight incident on the solar cell panel 120.

Since the solar cell panel 120 rotates by the rotation angle θ on an axis of the first direction D1, when the angle between the star direction $u_x$ and the normal direction of the solar cell panel 120 is minimized, the normal direction of the solar cell panel 120 is located on a plane formed by the first direction D1 and the star direction $u_x$. By using this relationship, the controller 150 may calculate the rotation angle θ where the pair of solar cell panels 120 may receive the solar power most efficiently.

A method of calculating, by the controller 150, the rotation angle θ for receiving the solar power most efficiently by the pair of solar cell panels 120 based on the beta angle β, the latitude φ, and the angle ψ (S40) will be described in more detail with reference to FIGS. 7A and 7B.

The controller 150 rotates the solar cell panel 120 by the rotation angle θ calculated in operation S40 (S50). The controller 150 may control the rotation driver 140 to rotate the solar cell panel 120 by the calculated rotation angle θ with respect to the main body 110.

Since the artificial satellite 100 continuously flies along the orbit O, the latitude φ changes with time and the beta angle β also changes after a long period of time. Thus, the controller 150 may proceed to operation S20 and repeat operations S20 to S50.

Figure 7A:
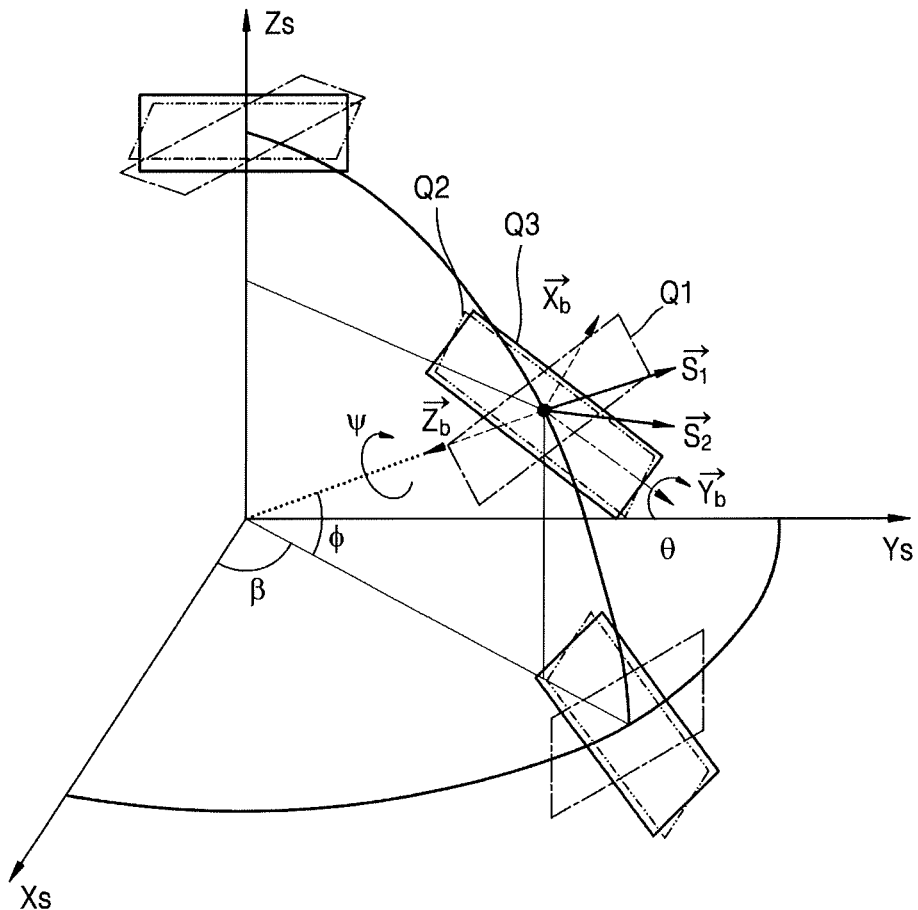
FIGS. 7A and 7B are schematic diagrams illustrating a method of determining a rotation angle by a controller of an artificial satellite according to an embodiment of the present disclosure.
Figure 7B:
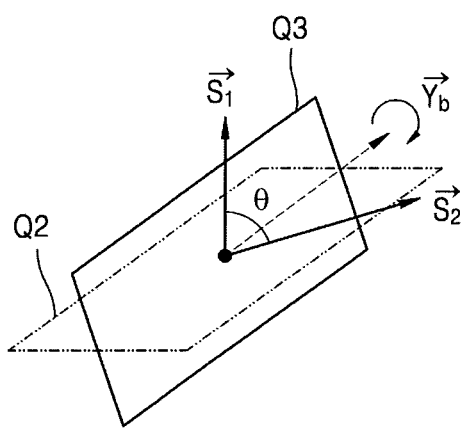

FIGS. 7A and 7B are schematic diagrams illustrating a method of determining a rotation angle by a controller of an artificial satellite, according to an embodiment of the present disclosure.

A planet center coordinate system (Xs, Ys, Zs) and a body coordinate system (Xb, Yb, Zb) of the artificial satellite are illustrated in FIG. 7A.

The origin of the planet center coordinate system (Xs, Ys, Zs) is the center of the planet on which the artificial satellite performs a mission. The star direction (e.g., the sun direction) is the Xs direction and the pole direction of the planet is the Zs direction. The Zs direction may be defined as a direction perpendicular to the Xs direction on the orbital plane of the artificial satellite passing over both poles (e.g., north pole and south pole) of the planet. The Ys direction is determined by the right-hand rule by using the Xs direction and the Zs direction.

The position of the artificial satellite in the planet center coordinate system (Xs, Ys, Zs) may be expressed by using the beta angle β (e.g., the sun beta angle β) and the latitude φ of the artificial satellite.

As described with reference to FIG. 3, the Yb direction in the body coordinate system (Xb, Yb, Zb) of the artificial satellite coincides with the first direction D1 in which the solar cell panel of the artificial satellite is arranged. The first direction Yb coincides with the rotation-axis direction of the solar cell panel.

When a unit vector $\vec{Y}_b$ of the first direction is represented by the planet center coordinate system (Xs, Ys, Zs), the unit vector $\vec{Y}_b$ of the first direction may be expressed as below by applying, to the Euler rotation formula, an operation of rotating a Ys-direction unit vector $[0, 1, 0]^T$ by a beta angle β on the Z axis, by a negative latitude φ on the Y axis, and by a negative angle ψ on the X axis.

$$\vec{Y}_b = \begin{bmatrix} Y_{bx} \\ Y_{by} \\ Y_{bz} \end{bmatrix} =$$

$$R_Z(\beta) \ R_Y(-\phi) \ R_X(-\psi) \begin{bmatrix} 0 \\ 1 \\ 0 \end{bmatrix} = \begin{bmatrix} \cos(\beta)\sin(\phi)\sin(\psi) - \sin(\beta)\cos(\psi) \\ \sin(\beta)\sin(\phi)\sin(\psi) + \cos(\beta)\cos(\psi) \\ -\cos(\phi)\sin(\psi) \end{bmatrix}$$

In FIG. 7A, three tetragons Q1, Q2, and Q3 are illustrated to conceptually represent the attitude of the artificial satellite. The tetragon Q1 is to represent a flight coordinate system of the artificial satellite, wherein a short side thereof represents the flight direction X and a long side thereof represents the horizontal direction Y. The tetragon Q1 may represent the attitude of a related-art artificial satellite wherein the solar cell panels are arranged in the horizontal direction Y.

The tetragon Q2 represents the attitude of the artificial satellite according to an embodiment of the present disclosure through the body coordinate system (Xb, Yb, Zb). The long side thereof represents the first direction D1 in which the solar cell panels are arranged, that is, the Yb direction. The normal direction of the tetragon Q1 and the tetragon Q2 represents the planet-center direction and represents the Zb direction. A first vector $\vec{S}_1$ represents a unit vector of the normal direction of the tetragon Q2.

The tetragon Q3 represents a solar cell panel of the artificial satellite according to an embodiment of the present disclosure. The solar cell panel may rotate on the rotation axis of the first direction Yb by the rotation angle θ with respect to the main body of the artificial satellite. A second vector $\vec{S}_2$ represents a unit vector of the normal direction of the tetragon Q3, that is, the solar cell panel.

The relationship between the tetragon Q2 and the tetragon Q3 is illustrated in more detail in FIG. 7B. The rotation angle θ may be defined as the angle from the first vector $\vec{S}_1$ to the second vector $\vec{S}_2$.

When the first vector $\vec{S}_1$ is represented by the planet center coordinate system (Xs, Ys, Zs), the first vector $\vec{S}_1$ may be expressed as below by applying, to the Euler rotation formula, an operation of rotating an Xs-direction unit vector $[1, 0, 0]^T$ by the beta angle β on the Z axis and by the negative latitude φ on the Y axis.

$$\vec{S}_1 = R_Z(\beta) \ R_Y(-\phi) \begin{bmatrix} 1 \\ 0 \\ 0 \end{bmatrix} = \begin{bmatrix} \cos(\beta)\cos(\phi) \\ \sin(\beta)\cos(\phi) \\ \sin(\phi) \end{bmatrix}$$

Since the solar cell panel rotates by the rotation angle θ on the axis of the Yb direction, the solar cell panel may receive sunlight at the maximum efficiency when the angle between the second vector $\vec{S}_2$ as a unit vector of the normal direction of the solar cell panel and a unit vector $\vec{u}_x$ of the Xs direction representing the star direction $u_x$ is minimized. In this case, the second vector $\vec{S}_2$ is located on a plane formed by the unit vector $\vec{u}_x$ of the star direction $u_x$ and the unit vector $\vec{Y}_b$ of the rotation-axis direction (i.e., the first direction) of the solar cell panel. Thus, the second vector $\vec{S}_2$ may be expressed as follows.

$$\vec{S}_2 = a(\vec{Y}_b + b\vec{u}_x)$$

Herein, "a" is a normalization constant for making the size of the second vector $\vec{S}_2$ equal to 1, and the unit vector $\vec{u}_x$ of the star direction $u_x$ is $[1, 0, 0]^T$.

"b" is a constant to be obtained and may be obtained as below by using the characteristic that the second vector $\vec{S}_2$ and the unit vector $\vec{Y}_b$ of the rotation-axis direction (i.e., the first direction) are perpendicular to each other.

$$(\vec{Y}_b + b\vec{u}_x) \cdot \vec{Y}_b = 0$$

$$1 + b\vec{u}_x \cdot \vec{Y}_b = 0$$

$$b = \frac{-1}{\cos\beta\sin\phi\sin\psi - \sin\beta\cos\psi} = \frac{-1}{Y_{bx}}$$

Thus, the second vector $\vec{S}_2$ may be expressed as follows.

$$\vec{S}_2 = a(\vec{Y}_b + b\vec{u}_x) = \frac{\begin{bmatrix} Y_{bx} - \frac{1}{Y_{bx}} \\ Y_{by} \\ Y_{bz} \end{bmatrix}}{\left\| \begin{bmatrix} Y_{bx} - \frac{1}{Y_{bx}} \\ Y_{by} \\ Y_{bz} \end{bmatrix} \right\|}$$

In this case, since the rotation angle θ of the solar cell panel is the angle between the first vector $\vec{S}_1$ and the second vector $\vec{S}_2$, the rotation angle θ of the solar cell panel for receiving sunlight at the maximum efficiency by the solar cell panel may be obtained as follows.

$$\theta = \cos^{-1}(\vec{S}_1 \cdot \vec{S}_2)$$

In this case, since an incidence angle $\theta_{si}$ of sunlight incident on the solar cell panel is the angle between the second vector $\vec{S}_2$ and the unit vector $\vec{u}_x$ of the star direction $u_x$, the incidence angle $\theta_{si}$ may be obtained as follows.

$$\theta_{si} = \cos^{-1}(\vec{u}_x \cdot \vec{S}_2)$$

Thus, the controller 150 of the artificial satellite may determine the rotation angle θ of the solar cell panel based the latitude φ where the artificial satellite 100 is currently located, the beta angle β between the star direction $u_x$ and the orbital plane of the orbit where the artificial satellite 100 is currently rotating, and the angle ψ between the horizontal direction Y and the rotation-axis direction (i.e., the first direction) of the solar cell panel.

The rotation angle θ may be defined as the angle of the normal direction $S_2$ of the solar cell panel with respect to the direction of the first vector $\vec{S_1}$, that is, the vertical direction $S_1$ from the ground surface of the planet to the artificial satellite 100.

The controller 150 may calculate the rotation angle θ as $\theta = \cos^{-1}(\vec{S_1} \cdot \vec{S_2})$. In this case, the first vector $\vec{S_1}$ is a unit vector of the vertical direction $S_1$ and the second vector $\vec{S_2}$ is a unit vector of the normal direction $S_2$ of the solar cell panel.

The controller 150 may calculate the first vector $\vec{S_1}$ as $$\vec{S_1} = \begin{bmatrix} \cos(\beta)\cos(\phi) \\ \sin(\beta)\cos(\phi) \\ \sin(\phi) \end{bmatrix}$$

based on the latitude φ and the beta angle β.

The controller 150 may determine the second vector $\vec{S_2}$ as $\vec{S_2} = a(\vec{Y_b} + b\vec{u_x})$ based on the unit vector $\vec{Y_b}$ of the rotational-axis direction (i.e., the first direction) and the unit vector $\vec{u_x}$ of the star direction $u_x$. In this case, "a" may be a normalization constant for making the size of the second vector $\vec{S_2}$ equal to 1, and "b" may be a constant determined such that the second vector $\vec{S_2}$ and the unit vector $\vec{Y_b}$ of the first direction are perpendicular to each other.

The controller 150 may calculate the unit vector $\vec{Y_b}$ of the rotation-axis direction (i.e., the first direction) as $$\vec{Y_b} = \begin{bmatrix} Y_{bx} \\ Y_{by} \\ Y_{bz} \end{bmatrix} = \begin{bmatrix} \cos(\beta)\sin(\phi)\sin(\psi) - \sin(\beta)\cos(\psi) \\ \sin(\beta)\sin(\phi)\sin(\psi) + \cos(\beta)\cos(\psi) \\ -\cos(\phi)\sin(\psi) \end{bmatrix}$$

based on the latitude φ, the beta angle β, and the angle ψ.

The controller 150 may calculate the second vector $\vec{S_2}$ as $$\vec{S_2} = \frac{\begin{bmatrix} Y_{bx} - \frac{1}{Y_{bx}} \\ Y_{by} \\ Y_{bz} \end{bmatrix}}{\left\| \begin{bmatrix} Y_{bx} - \frac{1}{Y_{bx}} \\ Y_{by} \\ Y_{bz} \end{bmatrix} \right\|}$$

based on the unit vector $\vec{Y_b}$ of the rotational-axis direction (i.e., the first direction).

Figure 8A:
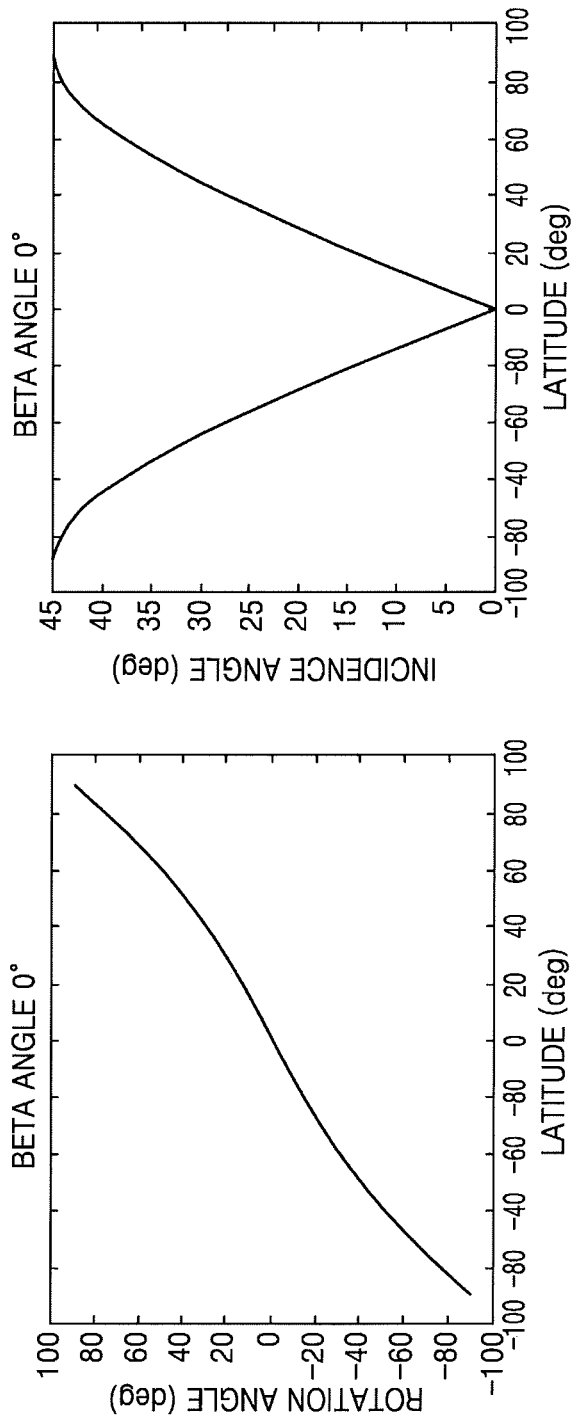
FIGS. 8A and 8B illustrate a rotation angle θ of a solar cell panel and an incidence angle $θ_{si}$ of sunlight incident on the solar cell panel, depending on a latitude φ of an artificial satellite, according to an embodiment of the present disclosure, wherein FIG. 8A corresponds to a case where a beta angle β is 0 degrees and FIG. 8B corresponds to a case where the beta angle β is 90 degrees.
Figure 8B:
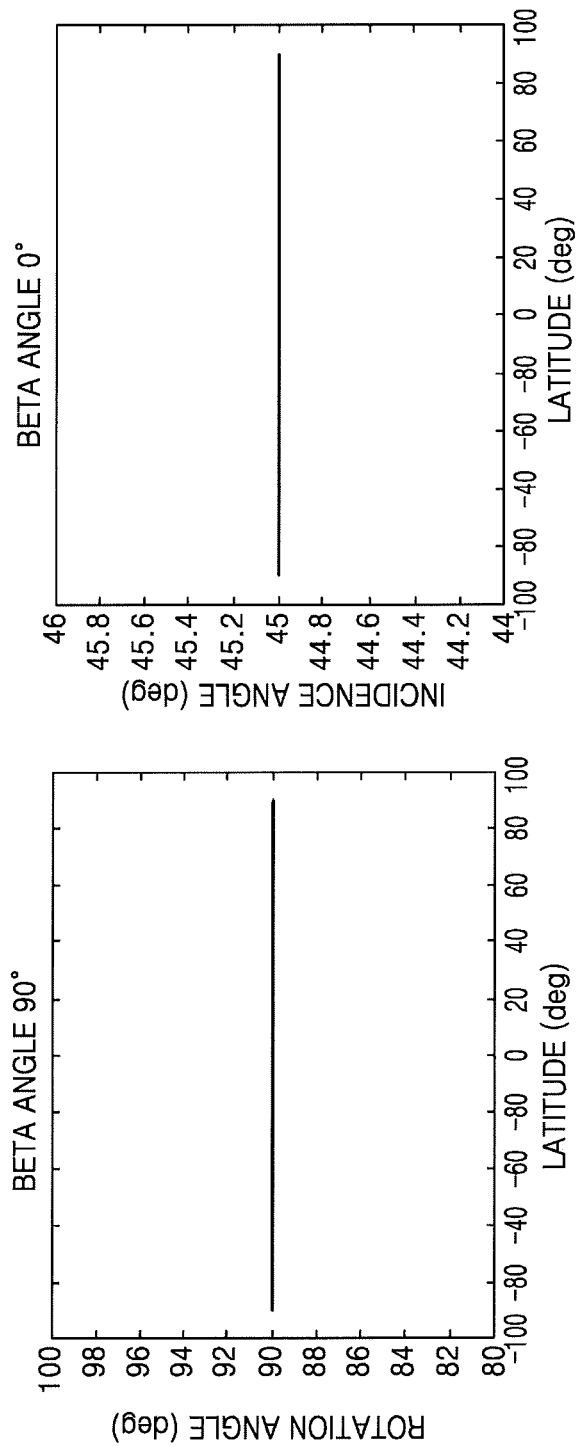

FIGS. 8A and 8B illustrate a rotation angle θ of a solar cell panel and an incidence angle $\theta_{si}$ of sunlight incident on the solar cell panel, depending on a latitude φ of an artificial satellite, according to an embodiment of the present disclosure. FIG. 8A corresponds to a case where a beta angle β is 0 degrees, and FIG. 8B corresponds to a case where the beta angle β is 90 degrees. An angle (ψ) between a rotation-angle direction (Yb, D1) of a solar cell panel of an artificial satellite and a horizontal direction (Y) perpendicular to a flight direction (X) is designed as 45 degrees.

Referring to FIG. 8A, the rotation angle θ changes from −90 degrees to 90 degrees as the latitude φ increases from −90 degrees to 90 degrees. In this case, the incidence angle $\theta_{si}$ of sunlight incident on the solar cell panel decreases from 45 degrees to 0 degrees as the latitude φ increases from −90 degrees to 0 degrees, and increases from 0 degrees to 45 degrees as the latitude φ Increases from 0 degrees to 90 degrees. Assuming that the solar cell panel generates power at an efficiency of 100% when the incidence angle $\theta_{si}$ is 0 degrees, the solar cell panel generates power at an efficiency of about 70% when the incidence angle $\theta_{si}$ is 45 degrees. Thus, according to an embodiment of the present disclosure, the solar cell panel may generate power at an efficiency of 70% or more even when the latitude φ of the artificial satellite changes.

Referring to FIG. 8B, since the beta angle β is 90 degrees, the rotation angle θ is always 90 degrees regardless of the latitude φ and the incidence angle $\theta_{si}$ is always 45 degrees regardless of the latitude φ. Thus, according to an embodiment of the present disclosure, the solar cell panel may generate power at an efficiency of 70% or more even when the beta angle β is 90 degrees.

Figure 9:
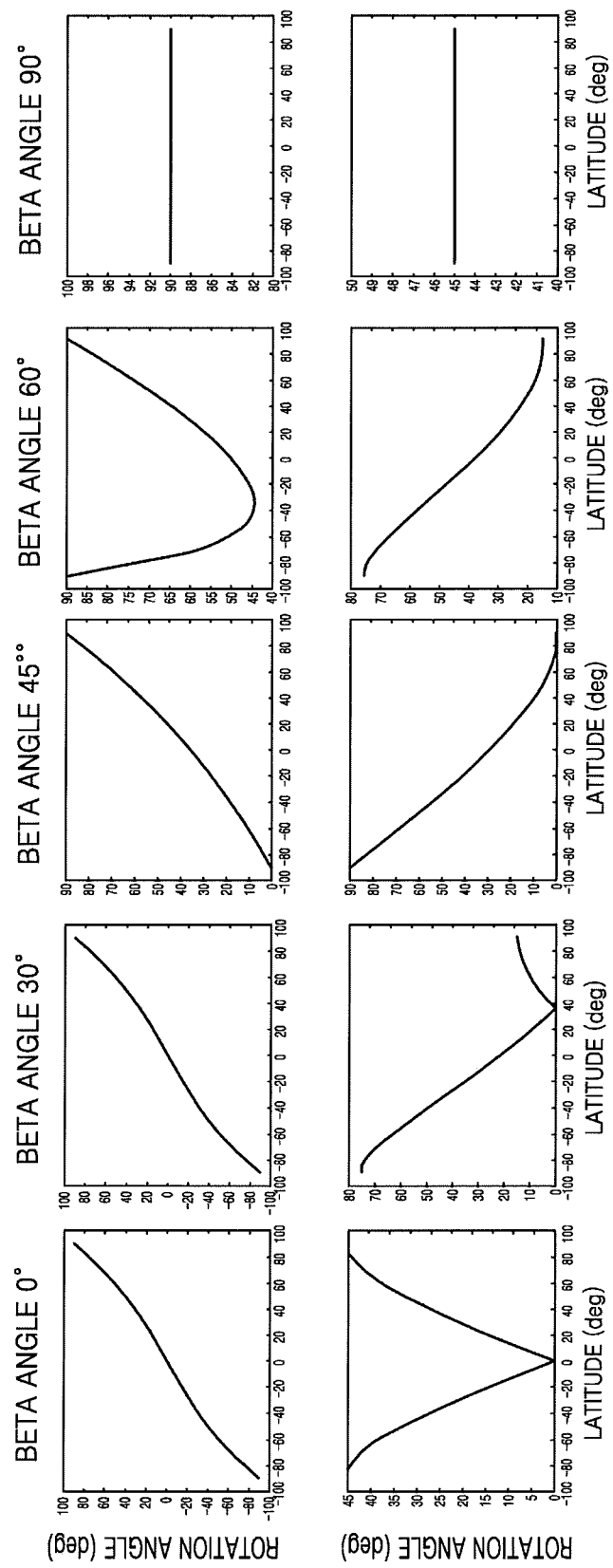
FIG. 9 illustrates a rotation angle θ of a solar cell panel and an incidence angle $θ_{si}$ of sunlight incident on the solar cell panel, depending on a latitude φ of an artificial satellite, according to an embodiment of the present disclosure when a beta angle β is 0 degrees, 30 degrees, 45 degrees, 60 degrees, or 90 degrees.

For reference, the rotation angle θ and the incidence angle $\theta_{si}$ depending on the latitude φ with respect to different beta angles β are illustrated in FIG. 9.

FIG. 9 illustrates a rotation angle θ of a solar cell panel and an incidence angle $\theta_{si}$ of sunlight incident on the solar cell panel, depending on a latitude φ of an artificial satellite, according to an embodiment of the present disclosure when a beta angle β is 0 degrees, 30 degrees, 45 degrees, 60 degrees, or 90 degrees.

Figure 10:
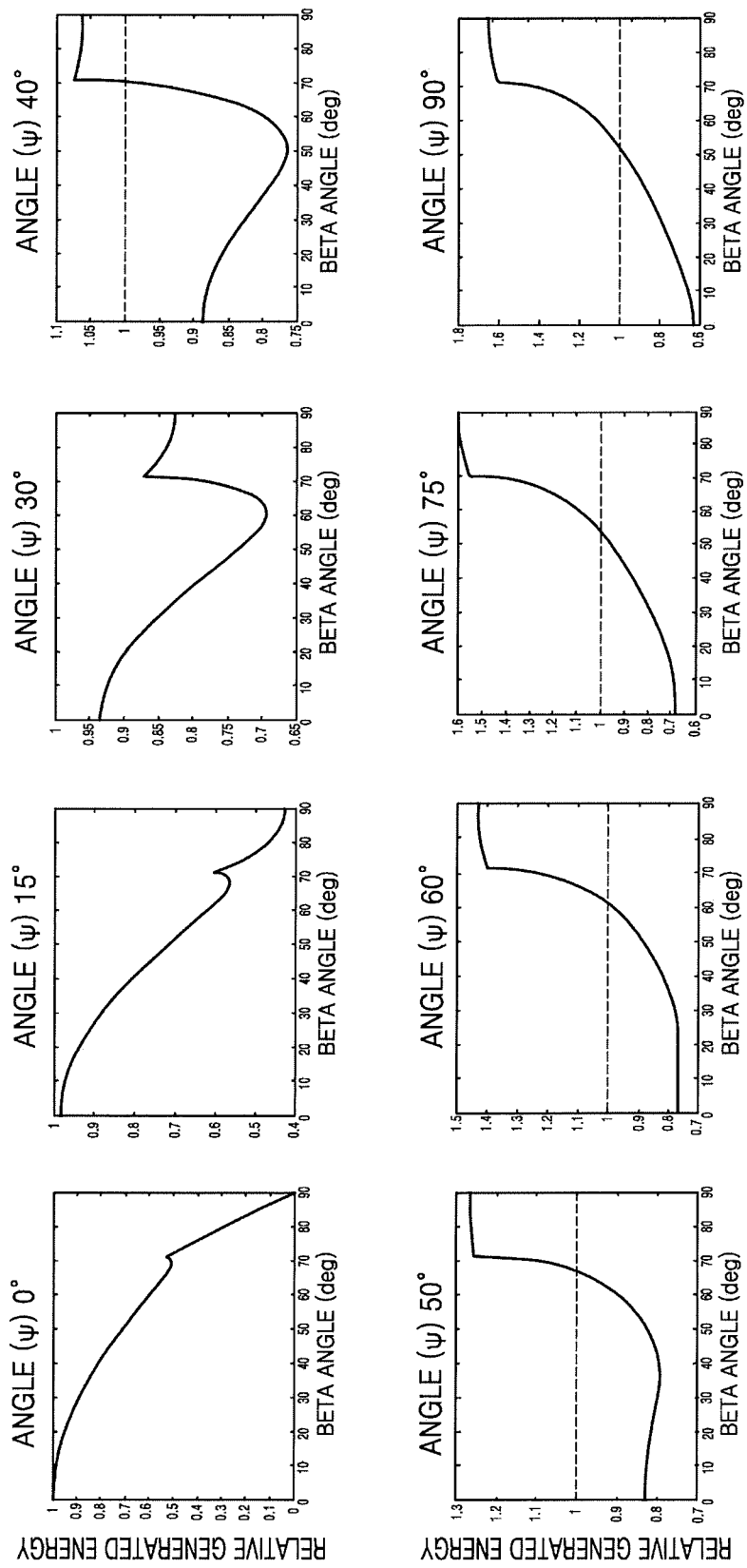
FIG. 10 illustrates reference diagrams for determining an angle ψ of an artificial satellite according to an embodiment of the present disclosure.

FIG. 10 illustrates reference diagrams for determining an angle ψ of an artificial satellite according to an embodiment of the present disclosure.

FIG. 10 are graphs illustrating the relative comparison of the generation energy of the solar cell panel depending on the beta angle β when the angle ψ of the artificial satellite is designed as 0 degrees, 15 degrees, 30 degrees, 40 degrees, 50 degrees, 60 degrees, 75 degrees, and 90 degrees. A numerical value 1 of the generation energy is a relative value and represents the energy that may be obtained from the sunlight when the artificial satellite makes one rotation around the orbit having a beta angle β of 0 degrees when the angle ψ of the artificial satellite is 0 degrees.

Considering the design conditions of the artificial satellite and the graphs illustrated in FIG. 10, the angle ψ of the artificial satellite was designed as 45 degrees according to the present disclosure. However, the angle ψ of the artificial satellite is not limited to 45 degrees and may be selected between 30 degrees and 60 degrees, or between 40 degrees and 50 degrees.

The artificial satellite according to the present disclosure may perform efficient power charge by using sunlight while performing a photographing mission in the orbit of a planet or a satellite. The artificial satellite according to the present disclosure may be stably operated because the artificial satellite is not affected by a disturbance because the center of mass of the artificial satellite does not change overall even when the solar cell panel rotates.

Although the present disclosure has been described with reference to the embodiments illustrated in the drawings, this is merely an example and those of ordinary skill in the art will understand that various modifications may be made therein. Thus, the spirit and scope of the present disclosure should be defined by the appended claims.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. An artificial satellite comprising:
a main body flying along an orbit of a planet;
an optical payload arranged on the main body to photograph a ground surface of the planet;
a pair of solar cell panels rotatably arranged on both sides of the main body in a first direction;
a rotation driver rotating the pair of solar cell panels on a rotation axis of the first direction with respect to the main body; and
a controller configured to control the rotation driver to rotate the pair of solar cell panels by a rotation angle θ,
wherein the controller determines the rotation angle θ based on a latitude φ where the artificial satellite is currently located, a beta angle β between a star direction $u_x$ and an orbital plane of an orbit where the artificial satellite is currently rotating, and an angle (90-ψ) between the first direction and a flight direction of the main body, and controls the rotation driver to rotate the pair of solar cell panels by the determined rotation angle θ,
wherein the angle (90-ψ) between the first direction and the flight direction is an acute angle.

2. The artificial satellite of claim 1, wherein the optical payload comprises a linear image sensor comprising pixels arranged in a line in a second direction perpendicular to the flight direction.

3. The artificial satellite of claim 1, wherein the optical payload comprises a line scan camera photographing the ground surface in such a manner as to scan a line region in a second direction perpendicular to the flight direction on a line-by-line basis along the flight direction.

4. An artificial satellite comprising:
a main body flying along an orbit of a planet;
a pair of solar cell panels rotatably arranged on both sides of the main body in a first direction;
a linear image sensor arranged on the main body and comprising pixels arranged in a line in a second direction, the second direction forming an acute angle with the first direction;
a rotation driver rotating the pair of solar cell panels on a rotation axis of the first direction with respect to the main body; and
a controller configured to control the rotation driver to rotate the pair of solar cell panels by a rotation angle θ,
wherein the controller determines the rotation angle θ based on a latitude φ where the artificial satellite is currently located, a beta angle β between a star direction $u_x$ and an orbital plane of an orbit where the artificial satellite is currently rotating, and an angle ψ between the first direction and the second direction or an angle (90-ψ) between the first direction and the flight direction, and controls the rotation driver to rotate the pair of solar cell panels by the determined rotation angle θ.

5. The artificial satellite of claim 4, wherein the artificial satellite flies on the orbit of the planet in a flight direction perpendicular to the second direction.

6. The artificial satellite of claim 4, wherein an angle between the first direction and the flight direction or the second direction is about 30 degrees to about 60 degrees.

7. The artificial satellite of claim 4, wherein an angle between the first direction and the flight direction or the second direction is about 45 degrees.

8. The artificial satellite of claim 4, wherein a normal direction of the pair of soar cell panels is perpendicular to the rotation axis.

9. The artificial satellite of claim 4, wherein a center of mass of the pair of solar cell panels is located on an extension line of the rotation axis regardless of the rotation of the pair of solar cell panels.

10. The artificial satellite of claim 4, wherein the rotation angle θ is an angle of a normal direction $S_2$ of the pair of solar cell panels with respect to a vertical direction $S_1$ from the ground surface to the artificial satellite.

11. The artificial satellite of claim 10, wherein the controller calculates the rotation angle θ as $\theta = \cos^{-1}(\vec{S_1} \cdot \vec{S_2})$, where a first vector $\vec{S_1}$ is a unit vector of the vertical direction $S_1$ and a second vector $\vec{S_2}$ is a unit vector of the normal direction $S_2$.

12. The artificial satellite of claim 11, wherein the controller calculates the first vector $\vec{S_1}$ as $$\vec{S_1} = \begin{bmatrix} \cos(\beta)\cos(\phi) \\ \sin(\beta)\cos(\phi) \\ \sin(\phi) \end{bmatrix}$$

based on the latitude φ and beta angle β.

13. The artificial satellite of claim 11, wherein the controller calculates the second vector $\vec{S_2}$ as $\vec{S_2} = a(\vec{Y_b} + b\vec{u_x})$ based on a unit vector $\vec{Y_b}$ of the first direction and a unit vector $\vec{u_x}$ of the star direction, where "a" is a normalization constant and "b" is a constant determined such that the second vector $\vec{S_2}$ and the unit vector $\vec{Y_b}$ of the first direction are perpendicular to each other.

14. The artificial satellite of claim 13, wherein the controller calculates the unit vector $\vec{Y_b}$ of the first direction as $$\vec{Y_b} = \begin{bmatrix} Y_{bx} \\ Y_{by} \\ Y_{bz} \end{bmatrix} = \begin{bmatrix} \cos(\beta)\sin(\phi)\sin(\psi) - \sin(\beta)\cos(\psi) \\ \sin(\beta)\sin(\phi)\sin(\psi) + \cos(\beta)\cos(\psi) \\ -\cos(\phi)\sin(\psi) \end{bmatrix}$$

based on the latitude φ, the beta angle β, and the angle ψ.

15. The artificial satellite of claim 14, wherein the controller calculates the second vector $\vec{S_2}$ as $$\vec{S_2} = \frac{\begin{bmatrix} Y_{bx} - \frac{1}{Y_{bx}} \\ Y_{by} \\ Y_{bz} \end{bmatrix}}{\left\| \begin{bmatrix} Y_{bx} - \frac{1}{Y_{bx}} \\ Y_{by} \\ Y_{bz} \end{bmatrix} \right\|}$$

based on the unit vector $\vec{Y_b}$ of the first direction.

16. A method of controlling an artificial satellite comprising a main body flying along an orbit of a planet, an optical payload mounted on the main body to photograph a ground surface of the planet in a line scan manner, and a pair of solar cell panels rotatably arranged on both sides of the main body in a first direction, wherein the first direction and a second direction perpendicular to a flight direction of the main body are designed to form an angle ψ of between about 0 degrees to about 90 degrees with each other, the method comprising:
  determining a beta angle β between a star direction $u_x$ and an orbital plane of the orbit where the artificial satellite is currently flying;
  determining a latitude φ of the planet where the artificial satellite is currently located;
  calculating a rotation angle θ of the pair of solar cell panels based on the beta angle β, the latitude φ, and the angle ψ; and
  rotating the pair of solar cell panels by the rotation angle θ with respect to the main body.

17. The method of claim 16, wherein
the rotation angle θ is an angle of a normal direction $S_2$ of the pair of solar cell panels with respect to a vertical direction $S_1$ from the ground surface to the artificial satellite, and
the calculating of the rotation angle θ comprises:
  calculating a first vector $\vec{S_1}$ that is a unit vector of the vertical direction $S_1$;
  calculating a second vector $\vec{S_2}$ that is a unit vector of the normal direction $S_2$; and
  calculating the rotation angle θ as $\theta = \cos^{-1}(\vec{S_1} \cdot \vec{S_2})$.

18. The method of claim 17, wherein the first vector $\vec{S_1}$ is calculated as $$\vec{S_1} = \begin{bmatrix} \cos(\beta)\cos(\phi) \\ \sin(\beta)\cos(\phi) \\ \sin(\phi) \end{bmatrix}$$

based on the latitude φ and beta angle β.

19. The method of claim 17, wherein the second vector $\vec{S_2}$ is determined as $\vec{S_2} = a(\vec{Y_b} + b\vec{u_x})$ based on a unit vector $\vec{Y_b}$ of the first direction and a unit vector $\vec{u_x}$ of the star direction, where "a" is a normalization constant and "b" is a constant determined such that the second vector $\vec{S_2}$ and the unit vector $\vec{Y_b}$ of the first direction are perpendicular to each other.

20. The method of claim 19, wherein the unit vector $\vec{Y_b}$ of the first direction is calculated as $$\vec{Y_b} = \begin{bmatrix} Y_{bx} \\ Y_{by} \\ Y_{bz} \end{bmatrix} = \begin{bmatrix} \cos(\beta)\sin(\phi)\sin(\psi) - \sin(\beta)\cos(\psi) \\ \sin(\beta)\sin(\phi)\sin(\psi) + \cos(\beta)\cos(\psi) \\ -\cos(\phi)\sin(\psi) \end{bmatrix}$$

based on the latitude φ, the beta angle β, and the angle ψ.

21. The method of claim 20, wherein the second vector $\vec{S_2}$ is calculated as $$\vec{S_2} = \frac{\begin{bmatrix} Y_{bx} - \frac{1}{Y_{bx}} \\ Y_{by} \\ Y_{bz} \end{bmatrix}}{\left\| \begin{bmatrix} Y_{bx} - \frac{1}{Y_{bx}} \\ Y_{by} \\ Y_{bz} \end{bmatrix} \right\|}$$

based on the unit vector $\vec{Y_b}$ of the first direction.

22. A non-transitory computer-readable recording medium having recorded thereon a program for executing the method of claim 16.

* * * * *